(12) United States Patent
Cheng

(10) Patent No.: US 11,386,525 B2
(45) Date of Patent: Jul. 12, 2022

(54) IMAGE STITCHING APPARATUS AND OPERATION METHOD THEREOF

(71) Applicant: Acer Incorporated, New Taipei (TW)

(72) Inventor: Chen-Ju Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 203 days.

(21) Appl. No.: 16/726,850

(22) Filed: Dec. 25, 2019

(65) Prior Publication Data

US 2021/0073940 A1 Mar. 11, 2021

(30) Foreign Application Priority Data

Sep. 6, 2019 (TW) .................................. 108132226

(51) Int. Cl.
*G06T 3/40* (2006.01)
*G01S 19/03* (2010.01)
*G06T 7/55* (2017.01)
*G06V 40/16* (2022.01)

(52) U.S. Cl.
CPC ............ *G06T 3/4038* (2013.01); *G01S 19/03* (2013.01); *G06T 7/55* (2017.01); *G06V 40/172* (2022.01); *G06T 2207/20221* (2013.01)

(58) Field of Classification Search
None
See application file for complete search history.

(56) References Cited

U.S. PATENT DOCUMENTS

| 9,053,556 | B2 * | 6/2015 | Matsuhira | ............. G06T 3/4038 |
| 2008/0219587 | A1 * | 9/2008 | Avidan | ................. G06T 3/0012 |
| | | | | 382/276 |
| 2010/0271393 | A1 * | 10/2010 | Forutanpour | ........... G06T 7/136 |
| | | | | 345/629 |
| 2014/0153832 | A1 * | 6/2014 | Kwatra | .................. G06T 11/00 |
| | | | | 382/195 |
| 2015/0139568 | A1 * | 5/2015 | Liu | .......................... G06T 7/33 |
| | | | | 382/284 |
| 2017/0178372 | A1 * | 6/2017 | Gormish | .............. G06K 9/4671 |
| 2018/0253875 | A1 * | 9/2018 | Gorur Sheshagiri | ....................... |
| | | | | G06T 3/0081 |
| 2019/0355100 | A1 * | 11/2019 | Kimura | ..................... G06T 7/70 |
| 2020/0126278 | A1 * | 4/2020 | Xu | .......................... G06T 7/174 |
| 2020/0134782 | A1 * | 4/2020 | Lai | ........................ G06T 3/4038 |

(Continued)

FOREIGN PATENT DOCUMENTS

| CN | 107529017 | 12/2017 |
| CN | 109146783 | 1/2019 |
| TW | 201843421 | 12/2018 |

OTHER PUBLICATIONS

Image Stitching on the Unmanned Air Vehicle in the Indoor Environment. Chen et al. (Year: 2012).*

*Primary Examiner* — Delomia L Gilliard
(74) *Attorney, Agent, or Firm* — JCIPRNET

(57) ABSTRACT

An image stitching apparatus and an operation method thereof are provided. The image stitching apparatus includes a stitching distance determining circuit and a stitching circuit. The stitching distance determining circuit dynamically determines the stitching distance according to the reference information related to the plurality of original images. The stitching circuit is coupled to the stitching distance determining circuit to receive the stitching distance. The stitching circuit image stitches the original images using a stitching distance to generate a stitched image.

16 Claims, 5 Drawing Sheets

(56) References Cited

U.S. PATENT DOCUMENTS

| | | | |
|---|---|---|---|
| 2020/0193606 A1* | 6/2020 | Douillard | G06K 9/6267 |
| 2020/0301013 A1* | 9/2020 | Banerjee | G01S 13/42 |
| 2020/0302686 A1* | 9/2020 | Totty | G06T 17/05 |

* cited by examiner

IMAGE STITCHING APPARATUS AND OPERATION METHOD THEREOF

CROSS-REFERENCE TO RELATED APPLICATION

This application claims the priority benefit of Taiwan application serial no. 108132226, filed on Sep. 6, 2019. The entirety of the above-mentioned patent application is hereby incorporated by reference herein and made a part of this specification.

BACKGROUND

Field of the Disclosure

The present disclosure relates to an image apparatus, and more particularly to an image stitching apparatus and an operation method thereof.

Description of Related Art

In applications of electronic image, it is often required to stitch two (or more) images into one image. For example, image splicing (image stitching) of two images can amplify the viewing angle of the image. Currently, the image stitching algorithm basically analyzes the feature points first, and then the overlapping portions of the two images are converted into another image by using the plane projection conversion according to the feature points. In most cases, there are parallax problems, ghost patterns, or overlapping images in image stitching.

For example, suppose there are two images taken from different angles, the feature set of one image is (Xi, Yi), and the feature set of the other image is (Xi', Yi'). There is a corresponding relationship between the feature points of the two images. Through the conversion matrix, the two partially overlapping images are overlapped to complete image stitching. Conventional image stitching apparatuses use a single stitching distance (i.e., a static stitching distance) for image stitching. The static stitching distance makes it difficult to attend to all aspects of the stitching effect of image stitching. If the image is stitched based on a nearby object (using a small static stitching distance), it is difficult to achieve a good splicing effect for the object with the background at a distance. If the image is stitched based on the object and the background at a distance (using a large static stitching distance), it is also difficult to achieve a good splicing effect for the nearby object.

The description of related art merely serves to understand the invention and thus may include information unknown to people having ordinary skill in the art. What is disclosed in this paragraph does not indicate that the issues to be resolved in one or more embodiments of the invention are already known to or understood by people having ordinary skill in the art before the subject application is filed.

SUMMARY OF THE DISCLOSURE

The disclosure provides an image stitching apparatus and an operation method thereof for dynamically determining the stitching distance.

The image stitching apparatus of the present disclosure includes a stitching distance determining circuit and a stitching circuit. The stitching distance determining circuit is configured to dynamically determine the stitching distance according to reference information related to a plurality of original images. The stitching circuit is coupled to the stitching distance determining circuit to receive the stitching distance. The stitching circuit is configured to image stitch the original images by using the stitching distance to generate a stitched image.

The operation method of the image stitching apparatus of the present disclosure includes: dynamically determining a stitching distance according to reference information related to the plurality of original images; and performing image stitching on the original images by using the stitching distance to generate the stitched image.

Based on the above, the image stitching apparatus and the operation method thereof according to the embodiments of the present disclosure can obtain reference information related to the original image. In some embodiments, the reference information includes an image distance of the face, an image distance of the main object, the color temperature information of the original image, and/or the position information of the original image. The image stitching apparatus can dynamically determine the stitching distance according to the reference information. Therefore, the image stitching apparatus can automatically generate stitched images suitable for different scenes.

In order to make the aforementioned features and advantages of the disclosure more comprehensible, embodiments accompanying figures are described in detail below.

DESCRIPTION OF EMBODIMENTS

Figure 1:
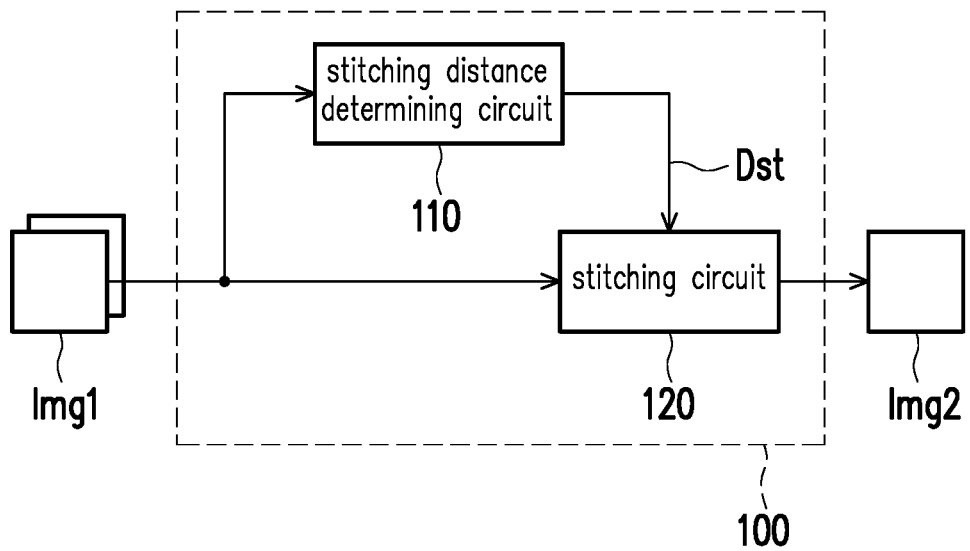
FIG. 1 is a schematic circuit block diagram of an image stitching apparatus according to an embodiment of the disclosure.

"Coupling" used in the full disclosure (including the claims) can refer to any direct or indirect connection means. For example, in the disclosure, if the first apparatus is coupled to (or connected to) the second apparatus, it should be interpreted that the first apparatus can be directly connected to the second apparatus, or the first apparatus can be indirectly connected to the second apparatus through another apparatus or a certain connection means. The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. In addition, where possible, the components/the elements/the steps in the drawings and the embodiments herein share the same or similar reference numerals. In different embodiments, the components/the elements/the steps having the same reference numerals or using the same wording may cross-reference to related descriptions.

FIG. 1 is a schematic circuit block diagram of an image stitching apparatus 100 according to an embodiment of the disclosure. The image stitching apparatus 100 shown in FIG. 1 includes a stitching distance determining circuit 110 and a stitching circuit 120. The stitching distance determining circuit 110 can dynamically determine the stitching distance Dst according to the characteristics of an original image Img1. The stitching circuit 120 is coupled to the stitching distance determining circuit 110 to receive the stitching distance Dst. The stitching circuit 120 performs image stitching on two (or more) original images Img1 by using a dynamic stitching distance Dst to generate a stitched image Img2.

According to design requirements, in some applications, the original image Img1 can be provided instantaneously by a camera (or image sensing chip, not shown). In such an application, the image stitching apparatus 100 can perform instant image stitching on the original image Img1. In other applications, the original image Img1 can be provided offline by a recording medium. In such an application, the image stitching apparatus 100 can perform offline image stitching on the original image Img1.

Figure 2:
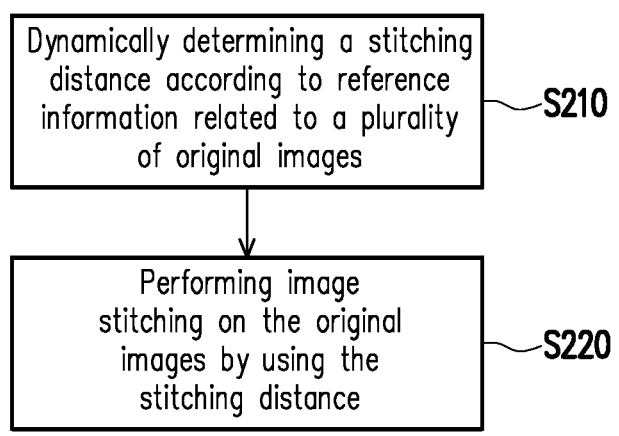
FIG. 2 is a schematic flow chart of an operation method of an image stitching apparatus according to an embodiment of the disclosure.

FIG. 2 is a schematic flow chart of an operation method of an image stitching apparatus according to an embodiment of the disclosure. In step S210, the stitching distance determining circuit 110 can dynamically determine the stitching distance Dst according to the reference information related to the two (or more) original images Img1. According to the design requirements, in some embodiments, the reference information may include image distance of the face, image distance of the object, color temperature information, position information, and/or other information related to the original image Img1.

In step S220, by using the stitching distance Dst dynamically determined by the stitching distance determining circuit 110, the stitching circuit 120 can perform image stitching on the original images Img1 to generate the stitched image Img2. This embodiment provides no limitation to the details of image stitching performed by the stitching circuit 120 on the original images Img1. For example, based on some design requirements, the stitching circuit 120 can perform a conventional image stitching algorithm or other algorithms in step S220 to facilitate image stitching on the original images Img1 by using the stitching distance Dst.

Figure 3:
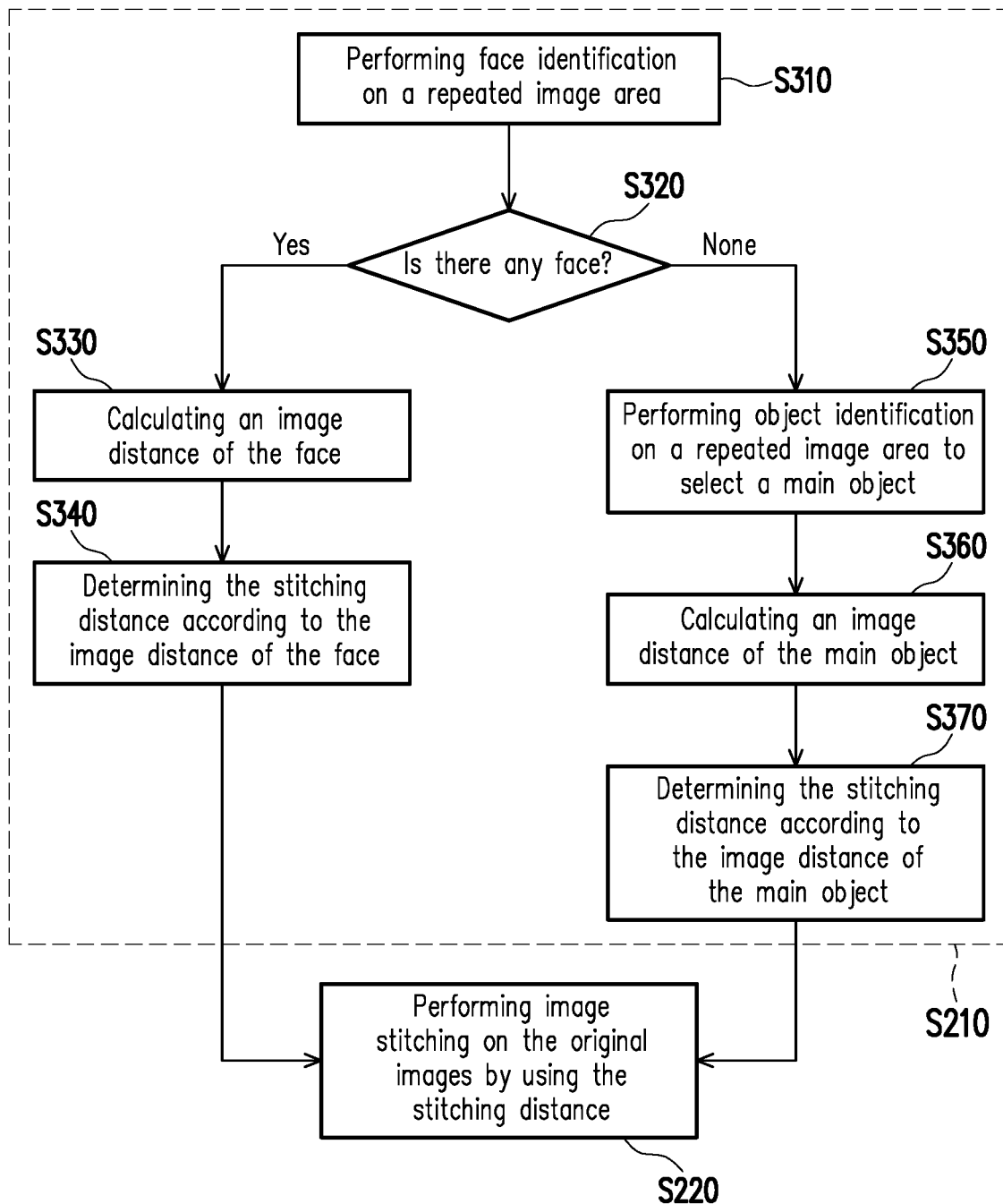
FIG. 3 is a schematic flow chart of an operation method of an image stitching apparatus according to another embodiment of the present disclosure.

FIG. 3 is a schematic flow chart of an operation method of an image stitching apparatus according to another embodiment of the present disclosure. Steps S210 and S220 shown in FIG. 3 can be derived from the related descriptions of steps S210 and S220 shown in FIG. 2. In the embodiment shown in FIG. 3, step S210 includes steps S310 to S370. Please refer to FIG. 1 and FIG. 3. In step S310, the stitching distance determining circuit 110 may perform face identification on the repeated image area between the original images Img1 to find a face (for example, a human face). In step S320, the stitching distance determining circuit 110 can determine whether there is any face in the repeated image area according to the identification result of step S310. This embodiment provides no limitation to the details of face identification performed by the stitching distance determining circuit 110. For example, based on some design requirements, the stitching distance determining circuit 110 may perform a conventional face identification algorithm or other algorithms in step S320 to facilitate face identification on the repeated image area.

When there is a face in the repeated image area (the determining result in step S320 is "Yes"), the stitching distance determining circuit 110 can proceed to step S330. In step S330, the stitching distance determining circuit 110 can calculate the image distance (or depth) of the face. The image distance can be interpreted as the distance from the camera to the face, or any information that can represent this distance. The embodiment provides no limitation to the details of calculating the image distance performed by the stitching distance determining circuit 110. For example, based on some design requirements, the stitching circuit 120 can perform a conventional image distance algorithm or other algorithms in step S330 to facilitate calculating the image distance (or depth) of the face.

In step S340, the stitching distance determining circuit 110 can dynamically determine the stitching distance Dst according to the image distance of the face. For example, but not limited to, the stitching distance determining circuit 110 can use the image distance of the face as the stitching distance Dst. Then, the stitching circuit 120 can perform image stitching on the original images Img1 by using the stitching distance Dst to generate the stitched image Img2 (step S220). Through face detection, it can be obtained that the main stitched object is a human face, not a background (for example, an office scene behind the human face). Therefore, the image distance of the human face can be used as the stitching distance with top priority, thereby achieving a better stitching effect for the human face.

When there is no face in the repeated image area (the determining result in step S320 is "None"), the stitching distance determining circuit 110 may perform step S350. In step S350, the stitching distance determining circuit 110 may perform object identification on the repeated image area between the original images Img1 to find at least one object. The stitching distance determining circuit 110 may select an object with a large area from the at least one object as the main object in step S350. For example, the stitching distance determining circuit 110 can identify an image area of different objects in the repeated image area, and use an object having a large area as the main object. The embodiment provides no limitation to the details of identifying the object performed by the stitching distance determining circuit 110. For example, based on some design requirements, the stitching circuit 120 may perform a conventional object identification algorithm or other algorithms in step S350 to facilitate identifying the objects in the repeated image area.

In step S360, the stitching distance determining circuit 110 may calculate the image distance (or depth) of the main object. The image distance can be interpreted as the distance from the camera to the main object, or any information that can represent the distance. For example, the stitching distance determining circuit 110 can scan the pixels of the repeated image area, and then calculate the depth of the main object in the image based on the distance of the pixel between the two original images Img1. According to the depth calculation result, the stitching distance determining circuit 110 can determine the image distance of the main object (for example, the largest object) located in the repeated image area. The embodiment provides no limitation to the details of calculating the image distance performed by the stitching distance determining circuit 110. For example, based on some design requirements, the stitching distance determining circuit 110 may perform a conventional image distance algorithm or other algorithm in step S360 to facilitate calculating the image distance (or depth) of the main object.

In step S370, the stitching distance determining circuit 110 may determine the stitching distance Dst according to the image distance of the main object. For example, but not limited to, the stitching distance determining circuit 110 can use the image distance of the main object as the stitching distance Dst. Then, the stitching circuit 120 can perform image stitching on the original images Img1 by using the stitching distance Dst to generate the stitched image Img2 (step S220).

Figure 4:
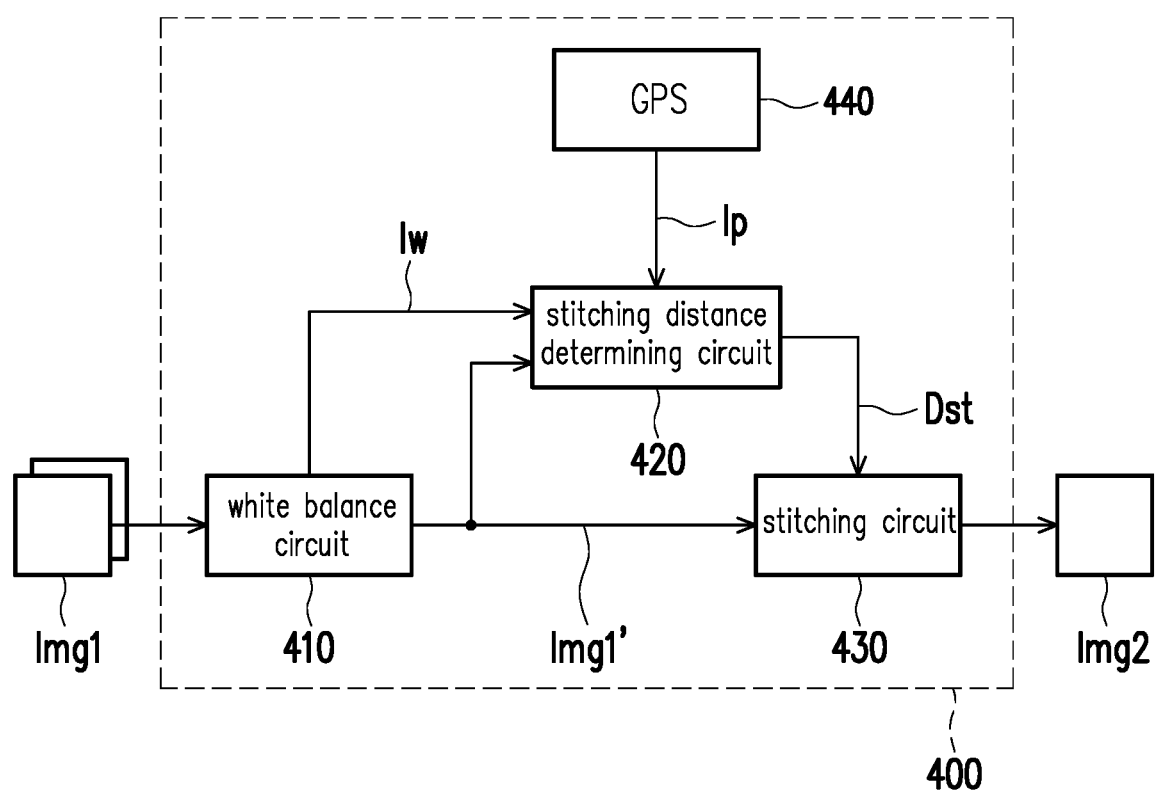
FIG. 4 is a schematic circuit block diagram of an image stitching apparatus according to another embodiment of the present disclosure.

FIG. 4 is a schematic circuit block diagram of an image stitching apparatus 400 according to another embodiment of the present disclosure. The image stitching apparatus 400 shown in FIG. 4 includes a white balance circuit 410, a stitching distance determining circuit 420, a stitching circuit 430, and a Global Positioning System (hereinafter referred to as GPS) circuit 440. The stitching distance determining circuit 420 and the stitching circuit 430 shown in FIG. 4 can be derived from the description of the stitching distance determining circuit 110 and the stitching circuit 120 shown in FIG. 1.

The white balance circuit 410 can perform white balance calculation on the original images Img1 to obtain the original image Img1'. In addition, the white balance circuit 410 can perform white balance calculation on the original images Img1 to obtain a calculation result (e.g. the color temperature information Iw related to the original images Img1). This embodiment provides no limitation to the details of calculating the white balance of the original images Img1 performed by the white balance circuit 410. For example, based on some design requirements, the white balance circuit 410 can perform a conventional white balance algorithm or other algorithms.

The GPS circuit 440 can detect the position of the image stitching apparatus 400 to obtain the position information Ip related to the original images Img1. This embodiment provides no limitation to the calculation details of detecting the position of the image stitching apparatus 400 performed by the GPS circuit 440. For example, based on some design requirements, the GPS circuit 440 can be a conventional GPS circuit or other circuit.

The stitching distance determining circuit 420 is coupled to the white balance circuit 410 and the GPS circuit 440 to receive the color temperature information Iw and the position information Ip. The stitching distance determining circuit 420 can dynamically determine the stitching distance Dst according to at least one of the color temperature information Iw, the position information Ip, and the original image Img1. The stitching circuit 430 is coupled to the stitching distance determining circuit 420 to receive the stitching distance Dst. The stitching circuit 430 performs image stitching on the two (or more) original images Img1' by using a dynamic stitching distance Dst to generate the stitched image Img2.

For example, the stitching distance determining circuit 420 can determine whether the scenes of the original images Img1 are an indoor environment according to the color temperature information Iw. When the scene is an indoor environment, the stitching distance determining circuit 420 can use one close-range distance as the stitching distance Dst. When the scene is an outdoor environment, the stitching distance determining circuit 420 can use one distant-range distance as the stitching distance Dst. The close-range distance and the distant-range distance can be determined according to design requirements. For example, the close-range distance may be the image distance of the foreground of the original image Img1, and the distant-range distance may be the image distance of the background of the original image Img1.

In another example, the stitching distance determining circuit 420 can determine whether the scenes of the original images Img1 are an indoor environment according to the position information Ip. When the scene is an indoor environment, the stitching distance determining circuit 420 can use a close-range distance as the stitching distance Dst. When the scene is an outdoor environment, the stitching distance determining circuit 420 can use a distant-range distance as the stitching distance Dst.

Figure 5:
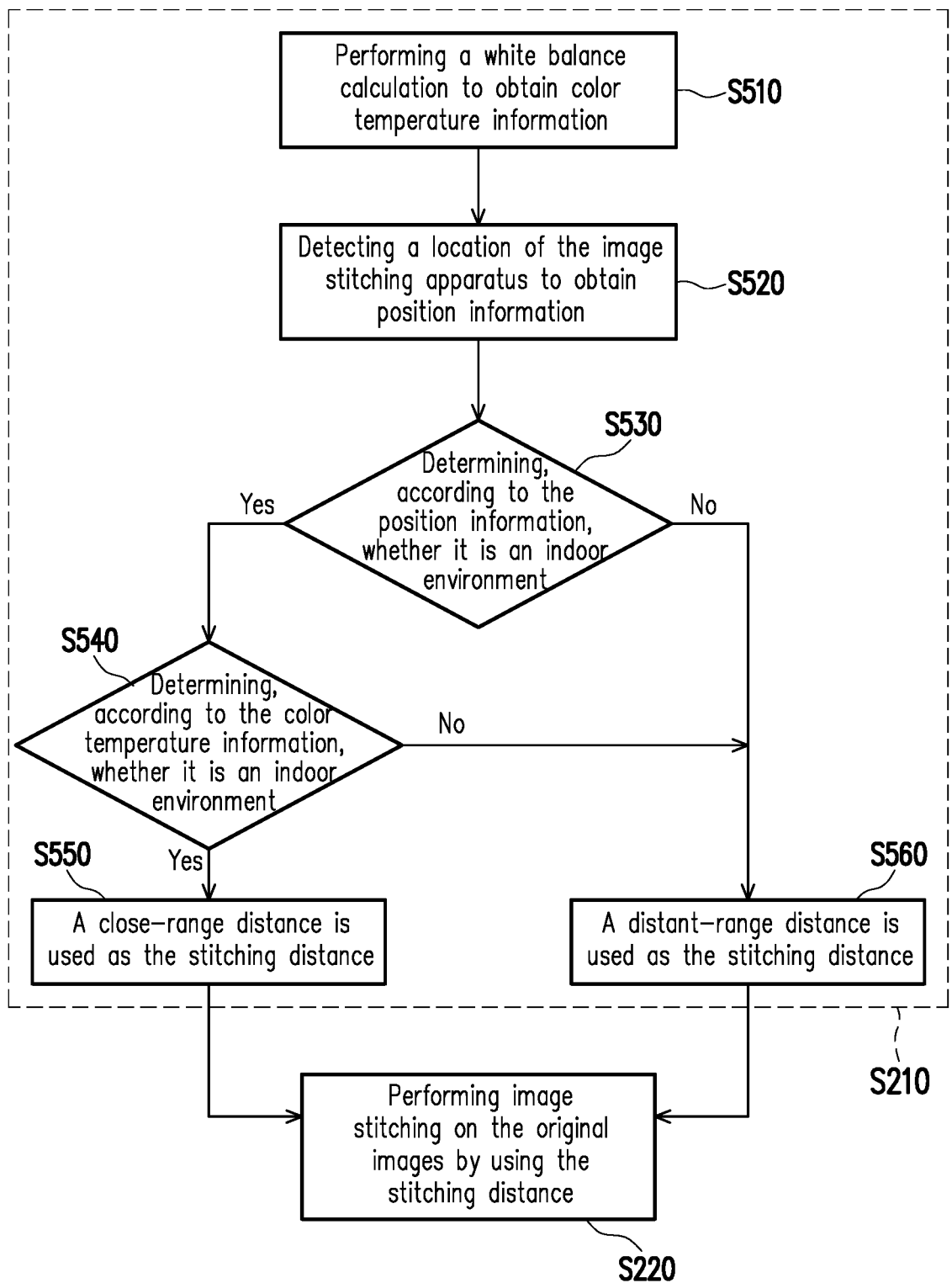
FIG. 5 is a schematic flow chart of an operation method of an image stitching apparatus according to still another embodiment of the present disclosure.

FIG. 5 is a schematic flow chart of an operation method of an image stitching apparatus according to still another embodiment of the present disclosure. Steps S210 and S220 shown in FIG. 5 can be derived from the related descriptions of steps S210 and S220 shown in FIG. 2. In the embodiment shown in FIG. 5, step S210 includes steps S510 to S560. Please refer to FIG. 4 and FIG. 5. In step S510, the white balance circuit 410 may perform white balance calculation on the original images Img1 to obtain the color temperature information Iw related to the original images Img1. This embodiment provides no limitation to the details of calculating the white balance performed by the white balance circuit 410. For example, based on some design requirements, the white balance circuit 410 can perform a conventional white balance algorithm or other algorithms in step S510 to obtain the color temperature information Iw related to the original images Img1.

In step S520, the GPS circuit 440 can detect the location of the image stitching apparatus 400 to obtain the position information Ip related to the original images Img1. In step S530, the stitching distance determining circuit 420 can determine whether the scenes of the original images Img1 are an indoor environment according to the position information Ip. When the determining result obtained based on the position information Ip is "indoor" (determining result in step S530 is "YES"), the stitching distance determining circuit 420 can proceed to step S540. When the determining result obtained based on the position information Ip is "outdoor" (the determining result in step S530 is "NO"), the stitching distance determining circuit 420 can perform step S560.

In step S540, the stitching distance determining circuit 420 can determine whether the scenes of the original images Img1 are an indoor environment according to the color temperature information Iw. When the determining result obtained based on the color temperature information Iw is "indoor" (the determining result in step S540 is "YES"), the stitching distance determining circuit 420 can perform step S550. In step S550, the stitching distance determining circuit 420 can use a close-range distance (using a small stitching distance) as the stitching distance Dst. Then, the stitching circuit 120 can perform image stitching on the original images Img1 by using the stitching distance Dst to generate the stitched image Img2 (step S220). In general, the parallax effect in a close range is more obvious. Because the distant-range object takes up less pixels in the image, the parallax effect in the distant range is less obvious. Therefore, the close-range distance is used as the stitching distance with top priority, so that the stitching effect of the foreground image is better.

When the determining result obtained based on the color temperature information Iw is "outdoor" (the determining result in step S540 is "NO"), the stitching distance determining circuit 420 can perform step S560. In step S560, the stitching distance determining circuit 420 can use a distant-range distance as the stitching distance Dst. Then, the stitching circuit 430 can perform image stitching on the original images Img1' by using the stitching distance Dst to generate the stitched image Img2 (step S220).

The stitching distance determining circuit 420 can determine whether the image scene is an indoor environment according to the white balance statistical result of the white balance circuit 410 (image processor). If the determining result is indoor, the image stitching is performed preferably based on a close-range distance (using a small stitching distance). For example, according to the color temperature information Iw calculated by the white balance circuit 410, the stitching distance determining circuit 420 can determine whether the light source of the image field is daylight or indoor light source. If the determining result is daylight, the stitching distance determining circuit 420 can select an infinitely far distance (distant-range distance) as the stitching distance required for image stitching.

The stitching distance determining circuit 420 can determine whether the image is taken in an indoor environment or an outdoor environment according to GPS information. If the determining result is outdoor, the stitching distance determining circuit 420 can select the distant-range distance (using a large stitching distance) for performing image stitching. If the determining result is indoor, a close-range distance (using a small stitching distance) is selected for performing image stitching. For example, when the camera device is equipped with GPS, if the determining result obtained based on the GPS information indicates that the image is taken in an outdoor environment, and no face is detected in the repeated image area, an infinitely far distance is used as the stitching distance required for performing image stitching.

Figure 6:
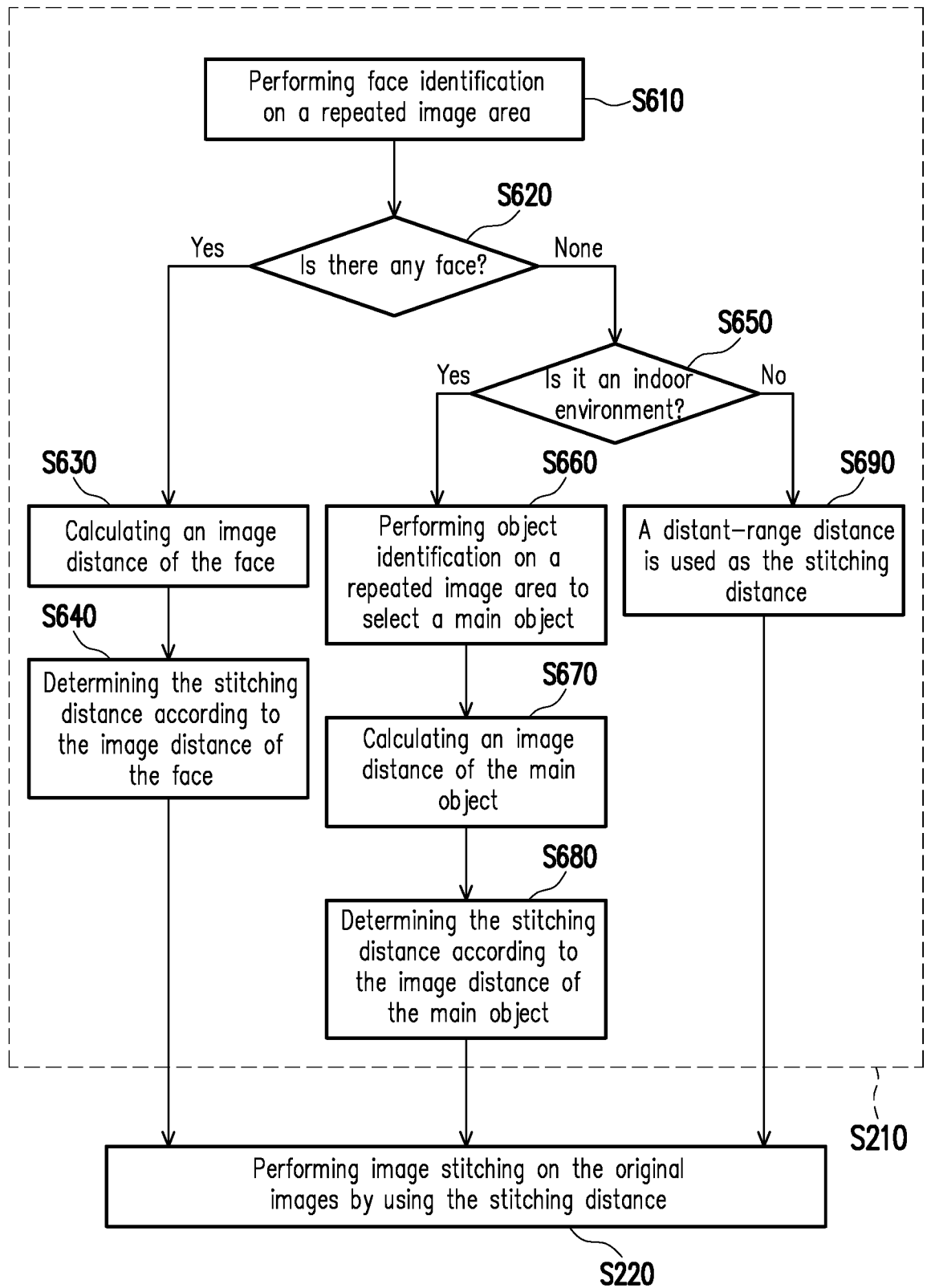
FIG. 6 is a schematic flow chart of an operation method of an image stitching apparatus according to yet another embodiment of the present disclosure.

FIG. 6 is a schematic flow chart of an operation method of an image stitching apparatus according to yet another embodiment of the present disclosure. Steps S210 and S220 shown in FIG. 6 can be derived from the related descriptions of steps S210 and S220 shown in FIG. 2. In the embodiment shown in FIG. 6, step S210 includes steps S610 to S690. Steps S610, S620, S630, S640, S660, S670, and S680 shown in FIG. 6 can be derived from the related description of step S310 to step S370 shown in FIG. 3. Please refer to FIG. 4 and FIG. 6. In step S610, the stitching distance determining circuit 420 may perform face identification on the repeated image area between the original images Img1' to find a face (for example, a human face). In step S620, the stitching distance determining circuit 420 can determine whether there is any face in the repeated image area according to the identification result of step S610.

When there is a face in the repeated image area (the determining result in step S620 is "Yes"), the stitching distance determining circuit 420 can perform step S630. In step S630, the stitching distance determining circuit 420 can calculate the image distance (or depth) of the face. In step S640, the stitching distance determining circuit 420 can dynamically determine the stitching distance Dst according to the image distance of the face. For example, but not limited to, the stitching distance determining circuit 420 can use the image distance of the face as the stitching distance Dst. Then, the stitching circuit 430 can perform image stitching on the original images Img1' by using the stitching distance Dst to generate the stitched image Img2 (step S220). Through face detection, it can be obtained that the main stitched object is a human face, not a background (for example, an office scene behind a human face). Therefore, the image distance of the human face can be used as the stitching distance with top priority, so that the stitching effect for the human face is better.

When there is no face in the repeated image area (the determining result in step S620 is "None"), the stitching distance determining circuit 420 can perform step S650. In step S650, the stitching distance determining circuit 420 can determine whether the scenes of the original images Img1 are an indoor environment. For example, in some embodiments, the white balance circuit 410 may perform white balance calculation on the original images Img1 in step S650 to obtain color temperature information Iw related to the original images Img1. Therefore, the stitching distance determining circuit 420 can determine whether the scenes of the original images Img1 are an indoor environment according to the color temperature information Iw in step S650.

In other embodiments, the GPS circuit 440 can detect the location of the image stitching apparatus 400 in step S650 to obtain the position information Ip related to the original images Img1. The stitching distance determining circuit 420 can determine whether the scenes of the original images Img1 are an indoor environment according to the position information Ip in step S650.

When the scene is "indoor" (the determining result in step S650 is "YES"), the stitching distance determining circuit 420 can perform step S660. In step S660, the stitching distance determining circuit 420 may perform object identification on the repeated image area between the original images Img1' to find at least one object. The stitching distance determining circuit 420 may select an object with a large area from the at least one object as the main object in step S660. For example, the stitching distance determining circuit 420 can identify the image area of different objects in the repeated image area, and use the object having a large area as the main object.

In step S670, the stitching distance determining circuit 420 can calculate the image distance (or depth) of the main object. For example, the stitching distance determining circuit 420 can scan the pixel of the repeated image area, and then calculate the depth of the main object in the image based on the distance of the pixel between the two original images Img1. According to the depth calculation result, the stitching distance determining circuit 420 can determine the image distance of the main object (for example, the largest object) located in the repeated image area.

In step S680, the stitching distance determining circuit 420 can determine the stitching distance Dst according to the image distance of the main object. For example, but not limited to, the stitching distance determining circuit 420 can use the image distance of the main object as the stitching distance Dst. Then, the stitching circuit 430 can perform image stitching on the original images Img1' by using the stitching distance Dst to generate the stitched image Img2 (step S220).

When the scene is "outdoor" (the determining result in step S650 is "NO"), the stitching distance determining circuit 420 can perform step S690. In step S690, the stitching distance determining circuit 420 can use a distant-range distance as the stitching distance Dst. Then, the stitching circuit 430 can perform image stitching on the original images Img1' by using the stitching distance Dst to generate the stitched image Img2 (step S220).

According to different design requirements, the implementation of the stitching distance determining circuit and/or the block of the stitching circuit may be in the form of hardware, firmware, software (i.e., program), or the combination of the above.

In the form of hardware, the stitching distance determining circuit and/or the block of the stitching circuit can be implemented in a logic circuit on an integrated circuit. The related functions of the stitching distance determining circuit and/or the stitching circuit may be implemented as hardware by using hardware description languages (such as Verilog HDL or VHDL) or other suitable programming languages. For example, the related functions of the stitching distance determining circuit and/or the stitching circuit may be implemented in one or more controllers, microcontrollers, microprocessors, application-specific integrated circuits (ASIC), digital signal processor (DSP), field programmable gate array (FPGA), and/or various logic blocks, modules, and circuits in other processing units.

In the form of software and/or firmware, the related functions of the stitching distance determining circuit and/or the stitching circuit may be implemented as programming codes. For example, the above stitching distance determining circuit and/or stitching circuit are implemented by using a general programming language (for example, C, C++, or a combination language) or other suitable programming language. The programming codes may be recorded/stored in a recording medium, for example, including a read only memory (ROM), a storage device and/or a random access memory (RAM). A computer, a central processing unit (CPU), a controller, a microcontroller or a microprocessor can read and execute the programming code from the recording medium to achieve related functions. As the recording medium, a "non-transitory computer readable medium" can be used; for instance, a tape, a disk, a card, a semiconductor memory, a programmable logic circuit and the like may be used. Moreover, the program can also be provided to the computer (or CPU) through any transmission medium (communication network or broadcast wave, etc.) The communication network is, for example, the Internet, wired communication, wireless communication or other communication medium.

In summary, the image stitching apparatus and the operation method thereof according to the embodiments of the present disclosure can obtain reference information related to the original image. In some embodiments, the reference information includes an image distance of the face, an image distance of the main object, the color temperature information of the original image, and/or the position information of the original image. The image stitching apparatus can dynamically determine the stitching distance according to the reference information. For example, the image stitching apparatus can actively detect the distance of the main object. According to the distance of the main object and the white balance of the image, the image stitching apparatus can determine the stitching distance to achieve the optimal stitching effect. The image stitching apparatus can automatically detect the most suitable stitching distance for the current image to match different scenes. Therefore, the image stitching apparatus can automatically generate stitched images suitable for different scenes.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. An image stitching apparatus, comprising:
   a stitching distance determining circuit configured to dynamically determine a stitching distance according to reference information related to a plurality of original images; and
   a stitching circuit coupled to the stitching distance determining circuit to receive the stitching distance, and configured to image stitch the original images by using the stitching distance to generate a stitched image,
   wherein the stitching distance is an image depth of a face or a main object in a repeated image area between the original images.

2. The image stitching apparatus of claim 1, wherein the stitching distance determining circuit performs face identification on the repeated image area between the original images to find the face, and the stitching distance determining circuit determines the stitching distance according to the face.

3. The image stitching apparatus of claim 2, wherein the stitching distance determining circuit calculates image depth of the face, the reference information comprises the image depth, and the stitching distance determining circuit determines the stitching distance according to the image depth of the face.

4. The image stitching apparatus of claim 1, wherein the stitching distance determining circuit performs object identification on the repeated image area between the original images to find at least one object, and the stitching distance determining circuit determines the stitching distance according to the at least one object.

5. The image stitching apparatus of claim 4, wherein the stitching distance determining circuit selects an object with a large area from the at least one object as the main object, and the stitching distance determining circuit calculates the image depth of the main object, the reference information comprises the image depth, and the stitching distance determining circuit determines the stitching distance according to the image depth of the main object.

6. An operation method of an image stitching apparatus, comprising:
   dynamically determining a stitching distance according to reference information related to a plurality of original images;
   performing image stitching on the original images by using the stitching distance to generate a stitched image,
   wherein the reference information comprises at least one of position information related to the original images and color temperature information.

7. An image stitching apparatus, comprising:
   a stitching distance determining circuit configured to dynamically determine a stitching distance according to reference information related to a plurality of original images; and
   a stitching circuit coupled to the stitching distance determining circuit to receive the stitching distance, and configured to image stitch the original images by using the stitching distance to generate a stitched image,
   wherein the reference information comprises at least one of position information related to the original images and color temperature information.

8. The image stitching apparatus of claim 7, further comprising:
   a white balance circuit configured to perform a white balance calculation on the original images to obtain a calculation result, wherein the calculation result comprises the color temperature information related to the original images, the reference information comprises the color temperature information, and the stitching distance determining circuit determines whether a scene of the original images is an indoor environment according to the color temperature information, and uses a close-range distance as the stitching distance when the scene is the indoor environment, and uses a distant-range distance as the stitching distance when the scene is an outdoor environment.

9. The image stitching apparatus of claim 7, further comprising:
a global positioning system circuit configured to detect a location of the image stitching apparatus to obtain the position information related to the original images;
wherein the reference information comprises the position information, and the stitching distance determining circuit determines whether a scene of the original images is an indoor environment according to the position information, and uses a close-range distance as the stitching distance when the scene is the indoor environment, and uses a distant-range distance as the stitching distance when the scene is an outdoor environment.

10. An operation method of an image stitching apparatus, comprising:
dynamically determining a stitching distance according to reference information related to a plurality of original images; and
performing image stitching on the original images by using the stitching distance to generate a stitched image,
wherein the stitching distance is an image depth of a face or a main object in a repeated image area between the original images.

11. The operation method of claim 10, wherein dynamically determining the stitching distance comprises:
performing face identification on the repeated image area between the original images to find the face; and
determining the stitching distance according to the face.

12. The operation method of claim 11, wherein dynamically determining the stitching distance comprises:
calculating the image depth of the face, wherein the reference information comprises the image depth; and
determining the stitching distance according to the image depth of the face.

13. The operation method of claim 10, wherein dynamically determining the stitching distance comprises:
performing object identification on the repeated image area between the original images to find at least one object; and
determining the stitching distance according to the at least one object.

14. The operation method of claim 13, wherein dynamically determining the stitching distance comprises:
selecting an object with a large area from the at least one object as the main object;
calculating the image depth of the main object, wherein the reference information comprises the image depth; and
determining the stitching distance according to the image depth of the main object.

15. The operation method of claim 6, wherein dynamically determining the stitching distance comprises:
detecting a location of the image stitching apparatus to obtain the position information related to the original images, wherein the reference information comprises the position information;
determining, according to the position information, whether a scene of the original images is an indoor environment;
wherein when the scene is the indoor environment, a close-range distance is used as the stitching distance; and
when the scene is an outdoor environment, a distant-range distance is used as the stitching distance.

16. The operation method of claim 6, further comprising:
performing a white balance calculation on the original images to obtain a calculation result,
wherein the calculation result comprises the color temperature information related to the original images, the reference information comprises the color temperature information, and dynamically determining the stitching distance comprises:
determining, according to the color temperature information, whether a scene of the original images is an indoor environment;
wherein when the scene is the indoor environment, a close-range distance is used as the stitching distance; and
when the scene is an outdoor environment, a distant-range distance is used as the stitching distance.

* * * * *